(No Model.)

E. HIGHAM.
DRILL FOR GLASS.

No. 350,132. Patented Oct. 5, 1886.

WITNESSES:
W. Wagner.
Wm D. Cokpernoll

INVENTOR
Edwin Higham
BY Wm H. Sisson and
C. F. Gooding
ATTORNEYS

UNITED STATES PATENT OFFICE.

EDWIN HIGHAM, OF CHICAGO, ILLINOIS.

DRILL FOR GLASS.

SPECIFICATION forming part of Letters Patent No. 350,132, dated October 5, 1886.

Application filed August 30, 1886. Serial No. 212,279. (No model.)

*To all whom it may concern:*

Be it known that I, EDWIN HIGHAM, of Chicago, in the county of Cook and State of Illinois, have invented a new and Improved Drill for Making Holes in Glass and other Substances, a full and exact description of which is set forth in the following specification, reference being had to the accompanying drawings.

My invention has particular reference to metallic rotating drills for the drilling of holes in glass and other vitreous substances. Heretofore all drills for that purpose have been made with a sharp or angular point, and great difficulty is had in making the drill "bite" or take hold of the material to be drilled without putting so great a pressure upon it as to endanger the breaking of the glass.

My invention is designed to remedy this difficulty, and to this end I make the drill beveled on two sides to form a wedge-shaped point with a knife-edge at right angles to the axis of the drill-bit.

Figure 1:
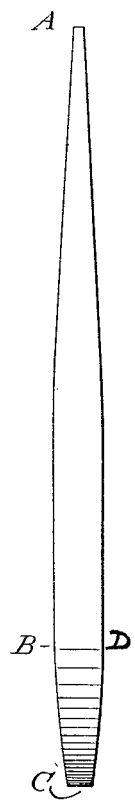
Figure 2:
Figure 3:
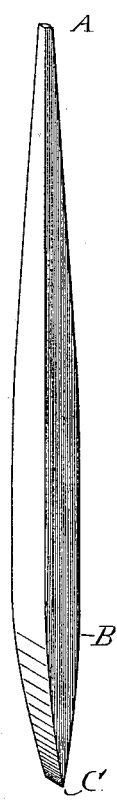

Referring to the drawings, Figure 1 is an enlarged side view of my improved drill enlarged to about double its ordinary size. Fig. 2 is an edge view, and Fig. 3 is a corner or perspective view, of the same.

Similar letters refer to similar parts throughout the drawings.

A is the top of the drill, which may be shaped to fit into an ordinary brace, drill-press, or other boring-machine arranged to impart a rotary motion to the drill B.

D, Fig. 1, is the commencement of the taper of the drill and is its maximum width, from which point it tapers on its sides to form the wedge-shaped point, as shown in Fig. 2, terminating in the knife-edge C, at right angles to the longitudinal axis of the drill, as shown, and on its edges the drill tapers slightly downward from the point B E, Fig. 2, its maximum thickness leaving the corners square and the knife-edge C slightly shorter than the width of the drill at its widest part B D, Fig. 1. The knife-edge C should preferably be in the form shown—viz., straight and at right angles with the longitudinal axis of the drill; but it may be slightly curved, or it may be at an angle varying slightly from right angles to said longitudinal axis without changing its effectiveness for the purposes desired.

The operation of my drill is as follows: The drill is fitted into a brace or other apparatus for revolving it upon its longitudinal axis, and is then placed at right angles to the glass or other material to be drilled, with the knife-edged point resting firmly against such material. The point is moistened with water or turpentine in the usual manner, and light pressure is applied to the drill, and the drill is then rotated upon its axis by the brace or other apparatus under constant light pressure. The knife-edge will from the beginning of the pressure and motion take hold of and cut the material to be drilled with the whole working face of the edge, and as long as such pressure and rotary movement is continued will work its way into the material, making a round hole, the square corners of the drill above the knife-edge operating as reamers to enlarge the hole to the full size of the drill as it enters the material, the size of the hole being regulated by the diagonal thickness of the drill. The pressure required is about one-half the pressure required with any other drill, and by the use of this drill the cost of drilling holes in glass is decreased at least fifty per cent.

Having thus described my invention, what I claim, and desire to secure by Letters Patent, is—

1. A drill for making holes in glass and other material, having a beveled point terminating in a straight knife-edge as a cutting-face, and to be rotated upon its longitudinal axis, substantially as shown and described.

2. A drill for making holes in glass and other material, provided with a wedge-shaped point terminating in a knife-edge at right angles or nearly at right angles to the longitudinal axis of the drill, substantially as shown and described.

3. A drill for making holes in glass or other material, having a sharp straight cutting-face at or nearly at right angles with the longitudinal axis of the drill, and the sharp corners or supplementary cutting-edges B C, to complete the hole to be drilled, substantially as shown and described.

4. In a drill for making holes in glass and other vitreous or brittle substances, the straight knife-edge C at right angles to the longitudinal axis of the drill, as a cutting-face, in combination with the sharp corners B C, as supplementary cutting-edges to enlarge and complete the hole as drilled, substantially as shown and described.

EDWIN HIGHAM.

Witnesses:
WM. D. COPPERNOLL,
JOHN D. FEE.